United States Patent
Pinnell et al.

(10) Patent No.: US 11,836,126 B2
(45) Date of Patent: Dec. 5, 2023

(54) METHOD AND SYSTEM FOR INDICATING DATA INDEX INTEGRITY

(71) Applicant: Dassault Systemes Americas Corp., Waltham, MA (US)

(72) Inventors: Charles Pinnell, Montreal (CA); Guy Daniel Rotheram, Milford, CT (US)

(73) Assignee: Dassault Systemes Americas Corp., Waltham, MA (US)

( * ) Notice: Subject to any disclaimer, the term of this patent is extended or adjusted under 35 U.S.C. 154(b) by 69 days.

(21) Appl. No.: 16/716,535

(22) Filed: Dec. 17, 2019

(65) Prior Publication Data

US 2020/0192877 A1    Jun. 18, 2020

Related U.S. Application Data

(60) Provisional application No. 62/780,828, filed on Dec. 17, 2018.

(51) Int. Cl.
| | |
|---|---|
| G06F 16/215 | (2019.01) |
| G06F 16/22 | (2019.01) |
| G06F 16/245 | (2019.01) |
| G06F 16/25 | (2019.01) |

(52) U.S. Cl.
CPC ........ *G06F 16/215* (2019.01); *G06F 16/2246* (2019.01); *G06F 16/245* (2019.01); *G06F 16/25* (2019.01)

(58) Field of Classification Search
None
See application file for complete search history.

(56) References Cited

U.S. PATENT DOCUMENTS

| | | | |
|---|---|---|---|
| 8,543,543 B2* | 9/2013 | Marcelais | G06F 16/137 707/634 |
| 2003/0033293 A1* | 2/2003 | Cheng | G06F 16/90339 |
| 2005/0240595 A1* | 10/2005 | Chandrasekaran | G06F 16/2246 |
| 2015/0052150 A1* | 2/2015 | Sharique | G06F 16/2255 707/747 |
| 2018/0288072 A1* | 10/2018 | Lipkey | H04L 63/1416 |
| 2021/0109900 A1* | 4/2021 | McIlroy | G06F 16/1752 |

OTHER PUBLICATIONS

Mohammad Norouzi; Fast Search in Hamming Space with Multi-Index Hashing; IEEE; 2012; pp. 3108-3115 (Year: 2012).*
Dassault Systemes; Exalead, A Practical Guide to Big Data: Opportunities, Challenges & Tools, 2012.
(Continued)

*Primary Examiner* — Albert M Phillips, III
*Assistant Examiner* — Jermaine A Mincey
(74) *Attorney, Agent, or Firm* — Sheehan Phinney; Bass & Green PA

(57) ABSTRACT

A method for validating a query result for a query of a database uses an index of the database. A selection of a set of source data from the database is received and a first hash operation is performed on the source data in the database resulting in a database hash value for the source data. A second hash operation is performed on the source data in the index resulting in an index hash value. The index hash value is compared with the database hash value, and a guarantee indication is provided for the source data in the index.

9 Claims, 6 Drawing Sheets

(56) References Cited

OTHER PUBLICATIONS

Miller, Tim, Chartio Data Tutorials "How does indexing work"; 2019, retrieved Jun. 29, 2023 https://chartio.com/learn/databases/how-does-indexing-work/.
Techterms.com "Relational Database" retrieved Jun. 22, 2023; https://techterms.com/definition/relational_database.
IBM Corporation; "What is a Relational Database?"; retrieved Jun. 22, 2023, https://www.ibm.com/topics/relational-databases.
Jatana, "A Survey and Comparison of Relational and Non-Relational Database;" International Journal of Engineering Research & Technology (IJERT), vol. 1 Issue 6, Aug. 2012.
E.F. Codd, "Relational Database: A Practical Foundation for Productivity" IBM San Jose Research Laboratory; Communications of the ACM; Feb. 1982 vol. 25, No. 2.

* cited by examiner

METHOD AND SYSTEM FOR INDICATING DATA INDEX INTEGRITY

CROSS-REFERENCE TO RELATED APPLICATIONS

This application claims the benefit of U.S. Provisional Patent Application Ser. No. 62/780,828, filed Dec. 17, 2019, entitled "METHOD FOR INDICATING DATA INDEX INTEGRITY," which is incorporated by reference herein in its entirety.

FIELD OF THE INVENTION

The present invention is directed to a computer-implemented method of evaluating and indicating to a user the integrity of a data set index.

BACKGROUND OF THE INVENTION

FIG. 1 is a schematic diagram of an exemplary system 100 with a database management system 110 and an index manager 140. The database management system 110 provides access to a database 115 for database users 130, who may access the database 115 remotely. For large and complex database tables and data sets, the data of the database 115 is often indexed in a stored index data structure 145 (or just "index" 145) to improve the speed and efficiency of searches on the data. The use of a database index 145 can improve the speed of data retrieval, though there is often a cost of additional storage space to maintain the index 145. Access to the index 145 may be by an index manager application 140, which in some cases may be internal to the database management system 110. The index 145 is used to quickly locate data without having to search every row in the database 115 every time the data is accessed. In some cases, database users 130 may be unaware if they are searching the actual database 115 or the index 145. In many situations using SQL, for example, the database management system 110 itself will decide upon receipt of a user query whether it is faster to search the database 115 or the index 145 of the data.

With the prevalent and ubiquitous nature of indexed data being made available to data consumers in place of direct database query results, and the trust that those consumers have in the accuracy of the results of querying those indexes, it is becoming increasingly common that critical decisions are made upon potentially erroneous index based data.

For Example:
  i. A manufacturing engineer discovers an issue with a part on the shop floor which could lead to the failure of a leaf spring which is part of a latch inside an escape hatch to the cockpit of an aircraft. Failure of the leaf spring will result in the latch staying closed preventing the escape hatch for the cockpit from opening.
  ii. The manufacturing engineer needs to trace all of the uses of that leaf spring within the company's flight hardware applications (failure in a piece of ground support equipment isn't an issue) to then remove the leaf spring from those applications and replace them with a coil spring which won't fail.
  iii. The manufacturing engineer queries an application which is using an index to determine all uses of the part number of the leaf spring. The application returns 20 instances, however the index hadn't yet been updated to include a design which was released the night before using the same leaf spring (out of date index condition) OR there had been an IT issue (software, hardware, environment, network, data, scripting, application server load, etc. ... ) which prevented the update of the index (resulting in partial data in the index).

In each of these cases the lack of integrity of the index leads to a condition where the manufacturing engineer used the tools he had to do his job and tracked down 20 uses of the leaf spring and made a replacement for the coil spring thinking he had searched and found all of the company's data. However in both cases, a potentially defective latch (containing the leaf spring which is known to fail) made it into a piece of safety critical flight hardware. In this case, the design of the search tool is at fault for the failure.

There are many technical reasons why an index 145 may not be complete when a query is performed; time lags between updating the dataset of the database 115 (which are typically random and can occur at virtually any time, based on the size of the database and the number of users accessing the database) and updating (or "refreshing") the index 145 (which is typically periodic, for example up to every five minutes), the time elapsed (or "time window") in the process of updating an existing index for a large dataset, network disruptions in the indexing process (utility outages, overloads, malware, etc.), unexpected data being encountered during the indexing, new synonyms being introduced, among others. Furthermore, some index refreshes are complete, while others are partial, so for large and/or frequently accessed databases, the likelihood that an index 145 and corresponding database 115 is out of sync is relatively high.

A typical approach to addressing this problem of a lack of integrity for indexes is to provide to the end user a static disclaimer about the potential for inaccuracy in the results. However, with the pervasive use of long, legalistically worded "End User License Agreements" and "Disclaimers" human nature leads to many end users ignoring those warnings and assuming personal liability by trusting the results of index based searches to make critical decisions. This does not surface as a problem until a disaster occurs as a result of decision-making based on incomplete information.

While it is possible to perform a direct database query for each entry in an associated index, such a solution does not scale to large databases. Therefore, there is a need in the industry to address one or more of these deficiencies.

SUMMARY OF THE INVENTION

Embodiments of the present invention provide a method and system for indicating data index integrity. Briefly described, the present invention is directed to a method and system for validating a query result for a query of a database resolved using an index of the database. A selection of a set of source data from the database is received and a first hash operation is performed on the source data in the database resulting in a database hash value for the source data. A second hash operation is performed on the source data in the index resulting in an index hash value. The index hash value is compared with the database hash value, and a guarantee indication is provided for the source data in the index.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
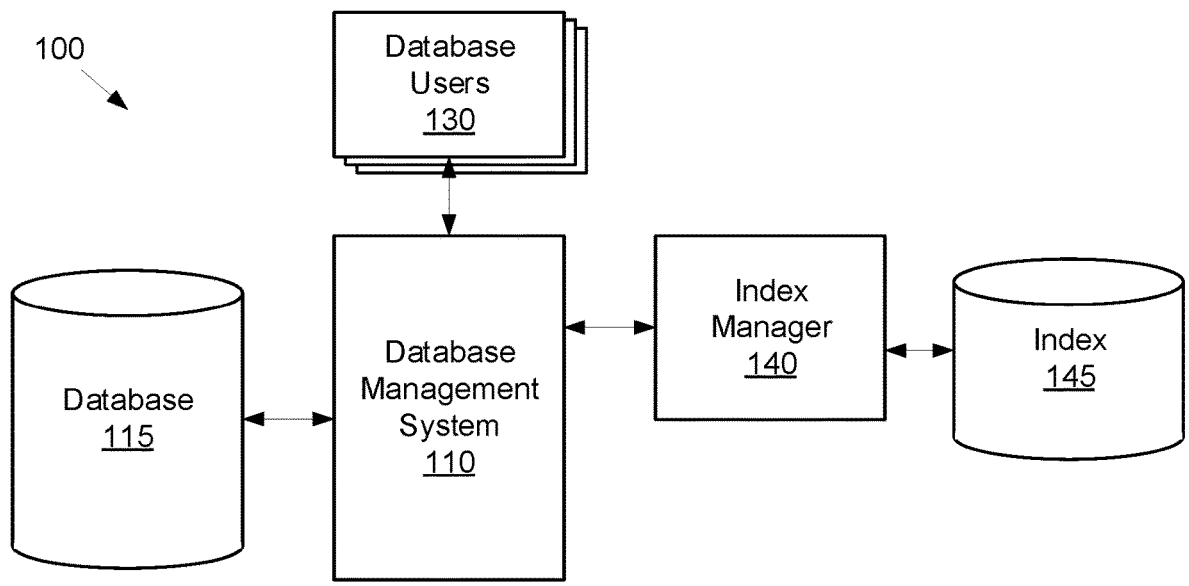
FIG. 1 is a schematic diagram of an exemplary system with a database and corresponding index.

The following definitions are useful for interpreting terms applied to features of the embodiments disclosed herein, and are meant only to define elements within the disclosure.

As used within this disclosure, a "guarantee" of an index refers to an assurance that the data in a database index has been synchronized with the associated database, indicating that data retrieved from the index corresponded with data in the database at the time of the query.

As used within this disclosure, a "database management system" (DBMS) refers to system software for creating and managing databases. A DBMS makes it possible for end users to create, read, update and delete data in a database. Examples of DBMS companies are: Oracle (Oracle DB), Microsoft (SQL Server), IBM (DB2). The embodiments described herein are used in conjunction with a DBMS not just a database (e.g., a flat file database), however, the embodiments are independent of the DBMS company they are implemented on.

As used within this disclosure, a "trigger" refers to a procedure within a DBMS that initiates an action when an event occurs that alters the database, for example, an event such as INSERT, DELETE or UPDATE. Since triggers are event-driven specialized procedures, they are stored in and managed by the DBMS.

As used within this disclosure, "indexing" refers to a way of sorting a number of records on multiple fields from a database. The sorted records/fields are stored in an index. For the most common type of indexing, called 'B-Tree', an index is created on a field in a data table that creates another data structure which holds the field value, and a pointer to the record it relates to. This index structure is then sorted, allowing binary searches to be performed on the index. The use and creation of such indexes and index structures on database tables are well known. Other common types of indexes include hash indexes, R-Tree, bitmap, search engine indexes, and semantic and linguistic indexes.

Reference will now be made in detail to embodiments of the present invention, examples of which are illustrated in the accompanying drawings. Wherever possible, the same reference numbers are used in the drawings and the description to refer to the same or like parts.

Figure 2:
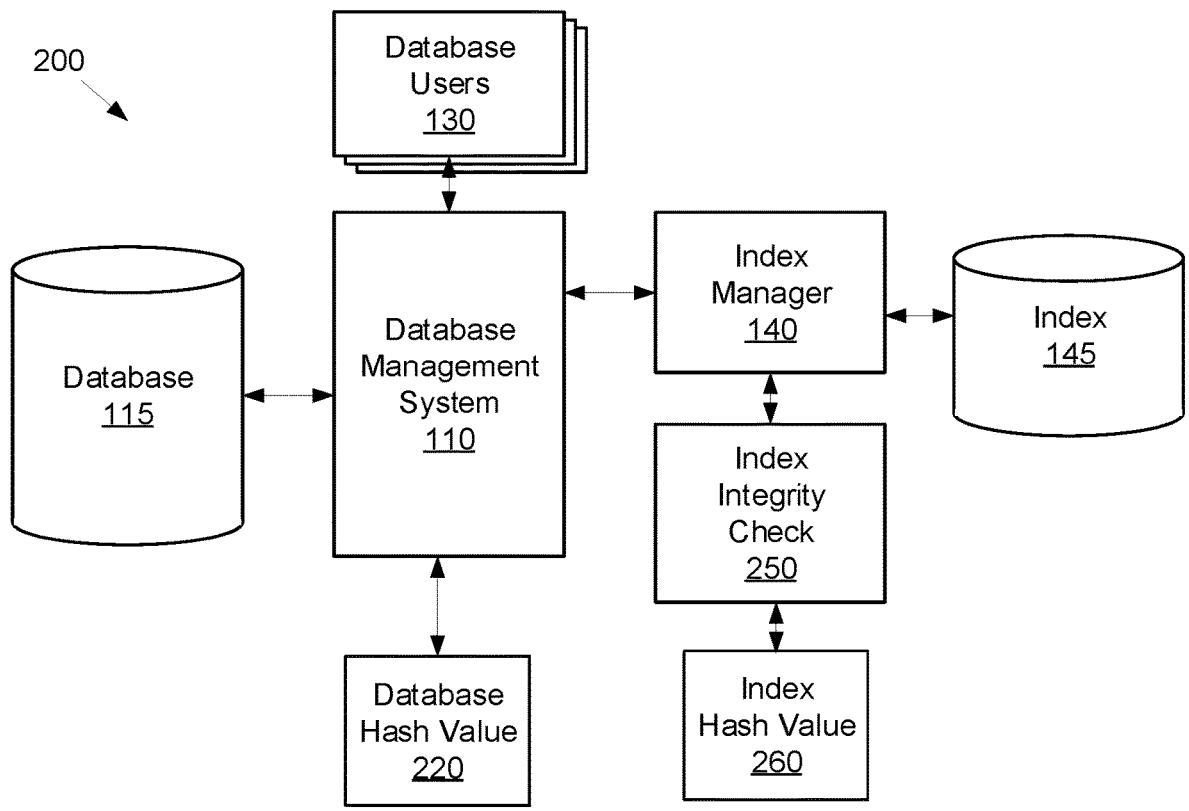
FIG. 2 is a schematic diagram of a first exemplary embodiment of a system providing data index integrity.

FIG. 2 is a schematic diagram of a first exemplary embodiment of a system providing data index integrity. Like FIG. 1, the first embodiment system includes a database 115, a database management system 110 providing access to the database 115 for database users 130, as well as an index manager 140 providing access to an index 145 containing one or more ordered representations of all or some of the data in the database 115.

The database 115 may be a relational data base (RDB) in a relational database management system (RDMS). Examples of an RDMS include Oracle Database, MySQL, Microsoft SQL Server, and IBM DB2. Non-relational database management systems include Apache HBase, IBM Domino, and Oracle NoSQL Database.

When a user queries the database management system 110 for information stored within the database 115, the database management system 110 decides whether to resolve the user query by directly accessing the database 115, or by accessing data specified by the query in the index 145 via the index manager 140. For example, the database management system 110 may decide to resolve the user query via accessing the index 145 instead of accessing the database 115 directly based on access efficiency issues, where it may be faster to resolve a specific query using the index 145 rather than directly accessing the database 115.

In addition to the elements shown by FIG. 1, FIG. 2 adds an index integrity check module 250 which functions to implement a process (described below) to guarantee a result of the user query resolved by the index 145. The index integrity check module 250 may be implemented by a separate process and/or processor from the index manager 140 and/or the database management system 110. Alternatively, the index integrity check module 250 may be implemented by the index manager 140 and/or the database management system 110. The index integrity check module 250 may have direct access to the database 115 and/or the index 145, or may access the database 115 via the database management system 110 and access the index 145 via the index manager. The index integrity check module 250 may store a local copy of an index hash value 260, which is described in greater detail below. Similarly, the database management system 110 maintains its own stored database hash value 220. As described further below, the index integrity check module 250 compares the database hash value 220 and the index hash value 260 in order to guarantee the query result.

Figure 3A:
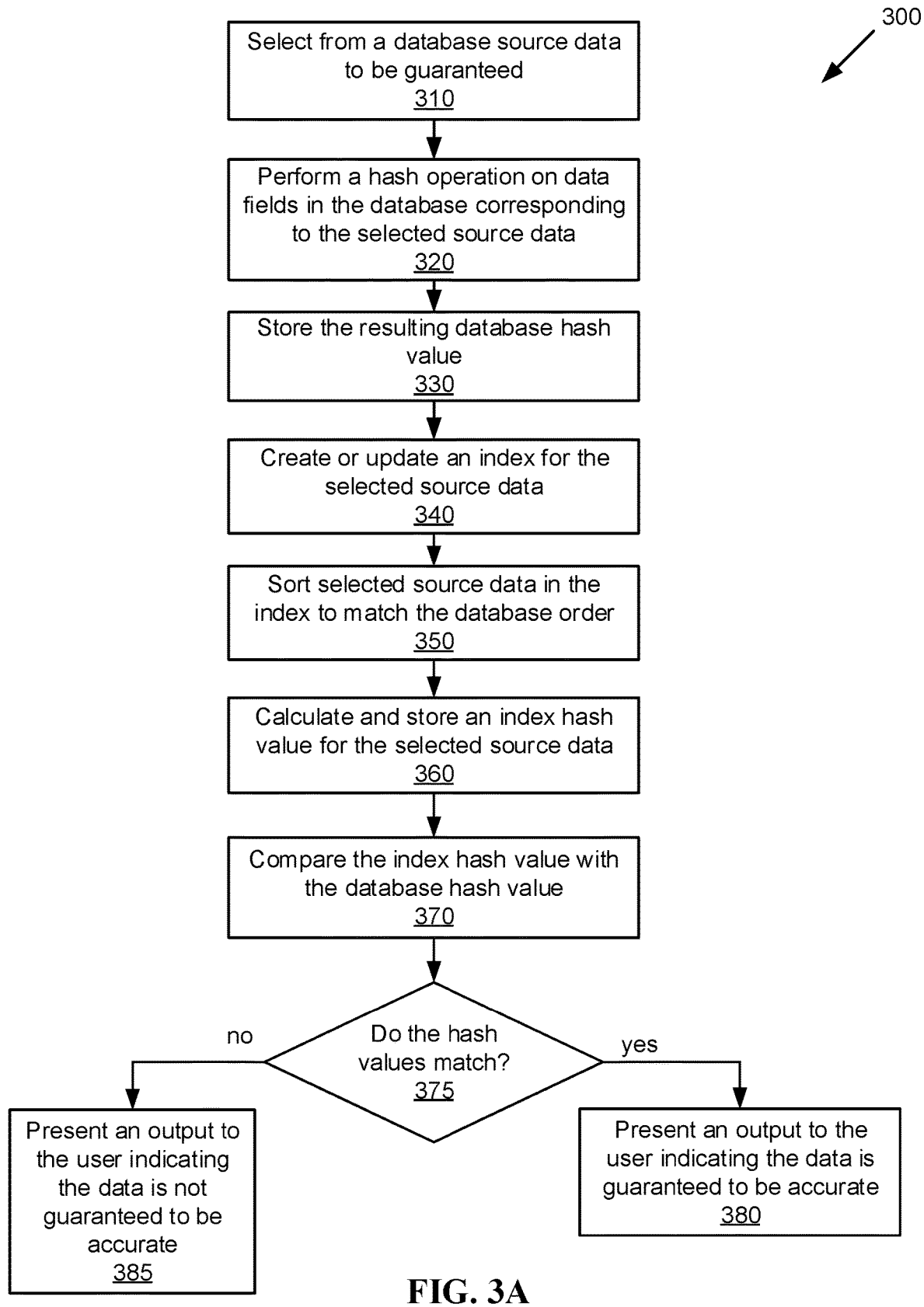
FIG. 3A is a flowchart of a first exemplary embodiment of a method for providing data index integrity.

FIG. 3A is a flowchart of an exemplary first embodiment of a method 300 for indicating data integrity. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The method 300 is described with reference to the elements of FIG. 2. Source data is selected from data stored a relational data table (database 115) to be guaranteed in an index 145 of the database 115 as shown by block 310. For example, a database user 130 may formulate a query to the database management system 110 requesting data from the database 115. The database management system 110 forwards the query to the index manager 140 to access the requested data from the index 145. It should be noted that for the embodiments, the index 145 generally refers to an offline data structure that includes data copied from the associated database 115 (and then otherwise manipulated/sorted). The index manager 140 invokes an index integrity check module 250 to guarantee the results of the user query.

The index manager 140 requests the database management system 110 to perform a hash operation on the data fields of the database 115 corresponding to the source data selected according to the user query, as shown by block 320. Alternatively, the hash operation of block 320 may be executed directly by the index manager 140. The resulting database hash value 220 is stored, as shown by block 330. The database management system 110 may provide a link to the index integrity check module 250 providing fast access to the database hash value 220.

The hash operation of block 320 consists of applying a hash function to the selected source data. As used within this disclosure, a hash function is any function or algorithm that is used to map data of arbitrary size to data of a fixed size. For a given database field, a hash function takes a block of data and returns a fixed-size bit string ("hash value"). A "good" hash function does not produce the same hash value from two different data inputs (known as a "collision"). The first embodiment employs a hash function that offers an extremely low risk of collision, for example, standard cryptographic hash functions such as MD5, MD4, SHA-1, SHA-2, SHA-256 etc., so that the database hash value 220 is unique to the selected source data (see block 310). Typical programming environments provide access to the hashing functions described herein via library calls.

An index 145 for the selected source data is created or updated, as shown by block 340. Typically, the index has been created before the user query was received. The index 145 is managed by the index manager 140, which may be integral to the DBMS 110. An example of an index manager 140 is Dassault Systemes' EXALEAD. The data in the index 145 is sorted to match the order of the data in the database 115, as shown by block 350.

The index integrity check module 250 computes and stores an index hash value 260 for the selected source data in the index 145, as shown by block 360. As described below in further detail, the index hashing of block 360 uses the same hashing algorithm used for the database hashing of block 320 for the same data fields in the same order.

The index hash value is compared with the database hash value 220, as shown by block 370. If the index hash value 260 matches the database hash value 220, the integrity check module presents an output to the database user 130 indicating the provided results of the user query is guaranteed to be accurate, as shown by block 380. If the database hash value 220 and the index hash value 260 do not match, a warning of unreliable data may be presented to the user, as shown by block 385. For example, a response to the user query may provide the data requested by the user query and display a guarantee status such as a text message or other visual cue indicating the response is guaranteed, or a text warning or other visual cue that the results of the query are not guaranteed. If the scope of the user query encompassed multiple fields, the query response may indicate that certain fields are guaranteed while other fields are not guaranteed. The method 300 can be reproduced across the columns of a data set automatically through the use of scripts in order to ensure the accuracy of a large set of indexed data.

As noted above, the index integrity check module compares the index hash value 260 with the database hash value 220, as shown by block 370. If the index hash value 260 and the database hash value 220 do not match, there is a possibility that the index 145 lost synchronization with the database 115 during a time window when the index integrity check module 250 was computing the index hash value 260. For example, the database 115 may have been altered by a "triggering event" such as a user access/edit during this time window.

Figure 3B:
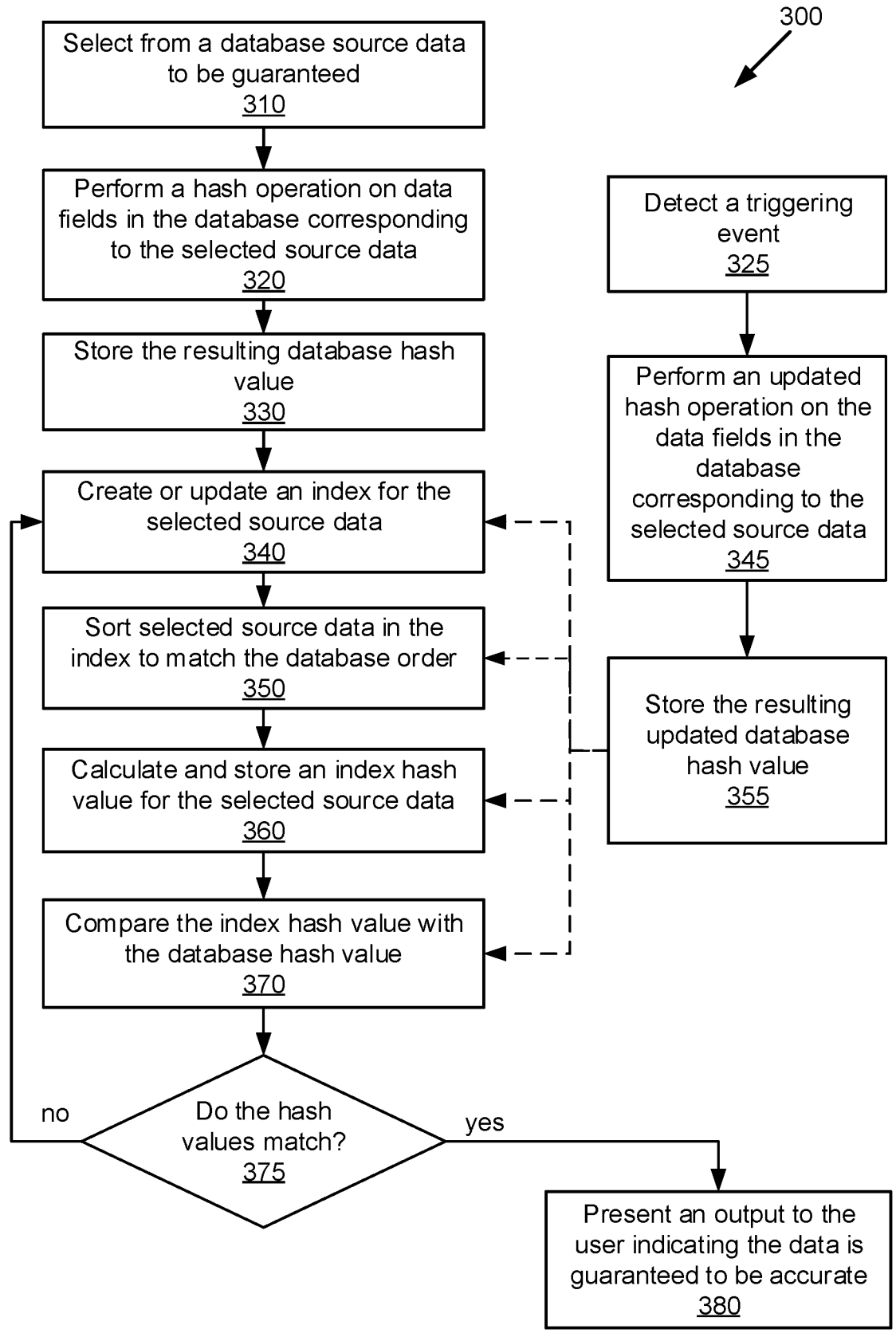
FIG. 3B is a flowchart of the first exemplary embodiment of the method of FIG. 3A further indicating a trigger event.

In the DBMS 110, a triggering event is an event that can modify content (tables) of the database 115, for example, insert, delete, or update commands. The DBMS 110 provides a built-in function (trigger) to capture any of these data changing commands. The triggering event (modification to data in DBMS 110) flags the re-computation of the database hash value 220. The DBMS 110 automatically fires the trigger as a result of a data modification to the associated table in the database 115. Therefore, if the data stored in the database 115 is modified in any manner, the index manager 140 is alerted to re-compute the hash on the data fields of interest. This ensures any modification to data 'triggers' a new database hash value 220 to be generated by the DBMS 110. Triggering events are generally asynchronous, and may therefore occur in the time window between when the index 145 as last updated and when the index hash value 260 is calculated. FIG. 3B illustrates the occurrence of a triggering event in the context of the first embodiment.

If the database management system 110 detects a triggering event, as shown by block 325, the database management system 110 re-computes the database hash value 220, as shown by block 345. This hash is performed in the same manner as block 320. The database management system 110 stores the updated hash value as the database hash value 220, replacing the database hash value 220 that was previously stored by the store of block 330. Since the triggering event is asynchronous, it may occur at any time between blocks 330 and 375, as indicated by the dashed lines.

If a triggering event occurred during the time window, the updated stored database hash value 220 will be different from the index hash value 260, which will be detected by the comparison of block 370. In alternative embodiments, if the stored database hash value 220 does not match the index hash value 260, the "no" branch from block 375 may result in updating the index 145 to synchronize with the database 115, as shown by block 340, followed by re-sorting the index (block 350), re-calculating and re-storing the index hash value 260 (block 360), and repeating the comparison of the database hash value 220 and the index hash value 260, as shown by block 370.

TABLE 1 dbo.IndividualTable 1 shows an example of a representative database table entitled 'dbo.Individual.' The database table includes of a plurality of database table columns labeled IndividualId, FirstName, LastName, and DateCreated, and a plurality of database table rows, labeled 1, 2, 3, 4 instantiated with values 1, Homer, Simpson, etc. Note that in this description, the terms "column" and "field" may be used interchangeably.

| | IndividualId | FirstName | LastName | DateCreated |
|---|---|---|---|---|
| 1 | 1 | Homer | Simpson | 2007-04-15 15:39:09 |
| 2 | 2 | Barney | Rubble | 2007-04-15 15:40:17 |

TABLE 1-continued dbo.IndividualTable 1 shows an example of a representative database
table entitled 'dbo.Individual.' The database table includes
of a plurality of database table columns labeled IndividualId,
FirstName, LastName, and DateCreated, and a plurality of database
table rows, labeled 1, 2, 3, 4 instantiated with values 1, Homer,
Simpson, etc. Note that in this description, the terms "column"
and "field" may be used interchangeably.

| IndividualId | FirstName | LastName | DateCreated |
|---|---|---|---|
| 3 | 3 | Ozzy | Osbourne | 2007-04-15 15:40:28 |
| 4 | 4 | Fred | Flintstone | 2007-04-15 18:22:13 |

The selection of source data (block 310) is generally a business decision. Here, the user may select a subset of the data in dbo.Individual for indexing. For example, if the business decides the only column they care about for integrity is LastName, then only the LastName column is used as the selected source data, and the DBMS 110 sets up a triggering event on changes to the LastName column. Then as per above, for any updates, inserts or deletions, the column (LastName) is updated (block 340), sorted (block 350), the database hash value is computed and stored (block 360), and the LastName column used by the index manager 140 to generate the index hash value 260 used to validate the database hash value 220 matches the index hash value 260.

Figure 4A:
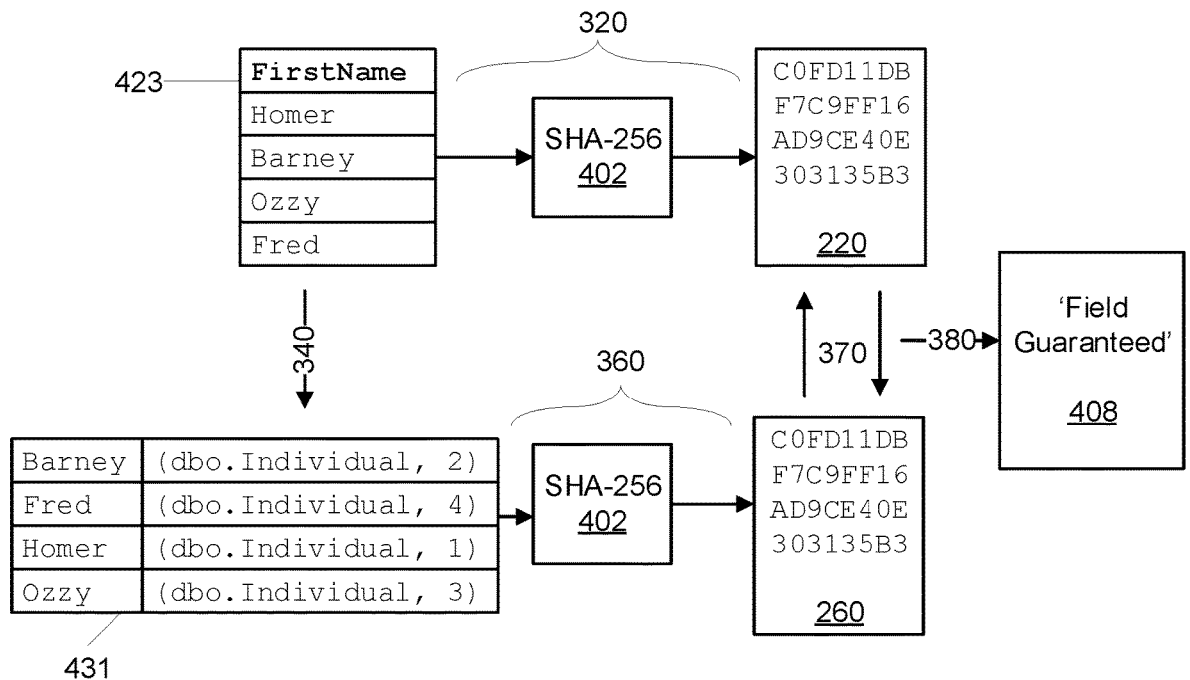
FIG. 4A is schematic diagrams of illustrating a first example under the method of FIG. 3A.
Figure 4B:
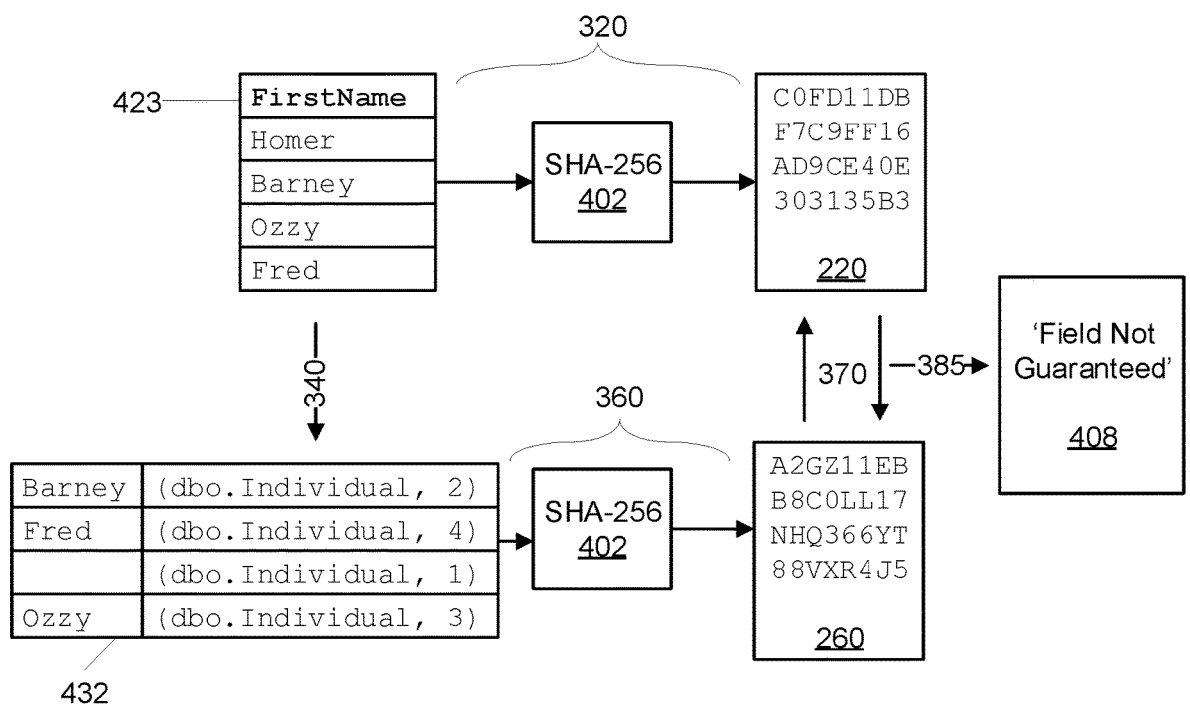
FIG. 4B is schematic diagrams of illustrating a second example under the method of FIG. 3A.

FIGS. 4A and 4B provide examples illustrating the above described embodiments of the invention. In FIG. 4A, the data from the FirstName column of Table 1 is shown as the selected source data 423 (the data to be guaranteed) in block 310 (FIG. 3A). The hashing operation 320 is applied to the selected source data 423 as described above regarding block 320 (FIG. 3A). The hashing operation 320 may be done manually or automatically. Also as described above, the type of hash function 402, here SHA-256, is selected to be unlikely to produce a collision. The hashing operation 320 produces the database hash value 220 (FIG. 2) which is stored in a manner providing fast access to the index manager 140 (FIG. 2). In some embodiments, the database hash value 220 may be stored in a hash table database.

The selected source data 423 is indexed as per block 340 (FIG. 3A) in a resultant index table 431. The index table 431 shown in FIG. 4A presents the field value (Barney, Fred, etc.) from selected source data 423 along with a pointer to the record and location in the database of Table 1. For example 'dbo.Individual, 2' indicates the database of Table 1 and the row on which the field value appears. The hashing operation of block 360 (FIG. 3A) is performed on the indexed data 431, using the same hash function 402 as in block 320. Here, the hashing operation produces the index hash value 260 equal to the database hash value 220. These index hash value 260 and the database hash value 220 are compared, for example, by a comparator or the like, as per block 370 (FIG. 3A), and a positive indication 408, here the text string "Field Guaranteed" is presented to the user indicating the data of interest is guaranteed in the index 431, as per block 380 (FIG. 3A).

In FIG. 4B, the selected source data 423 is identical to the source data of FIG. 4A and the hashing operation 320, hash function 402, and resultant database hash value 220 are the same as depicted in FIG. 4A. However, unlike FIG. 4A, in FIG. 4B the indexing 340 does not result in an accurate index 432 of the selected source data 423. A piece of data (here, Homer) is missing from the index table 432. Because the data in the index table 432 now does not match the selected source data 423, when the hashing operation 360 is applied to the data in the index table 432 using the same hash function 402, an index hash value 260 different from FIG. 4A is generated. When the index hash value 260 of FIG. 4B is compared as per block 370 (FIG. 3A) to the database hash value 220 produced by the source data hashing operation 320, there is no match. A negative indication 408 is then presented to the user, as per block 385 (FIG. 3A).

Figure 5:
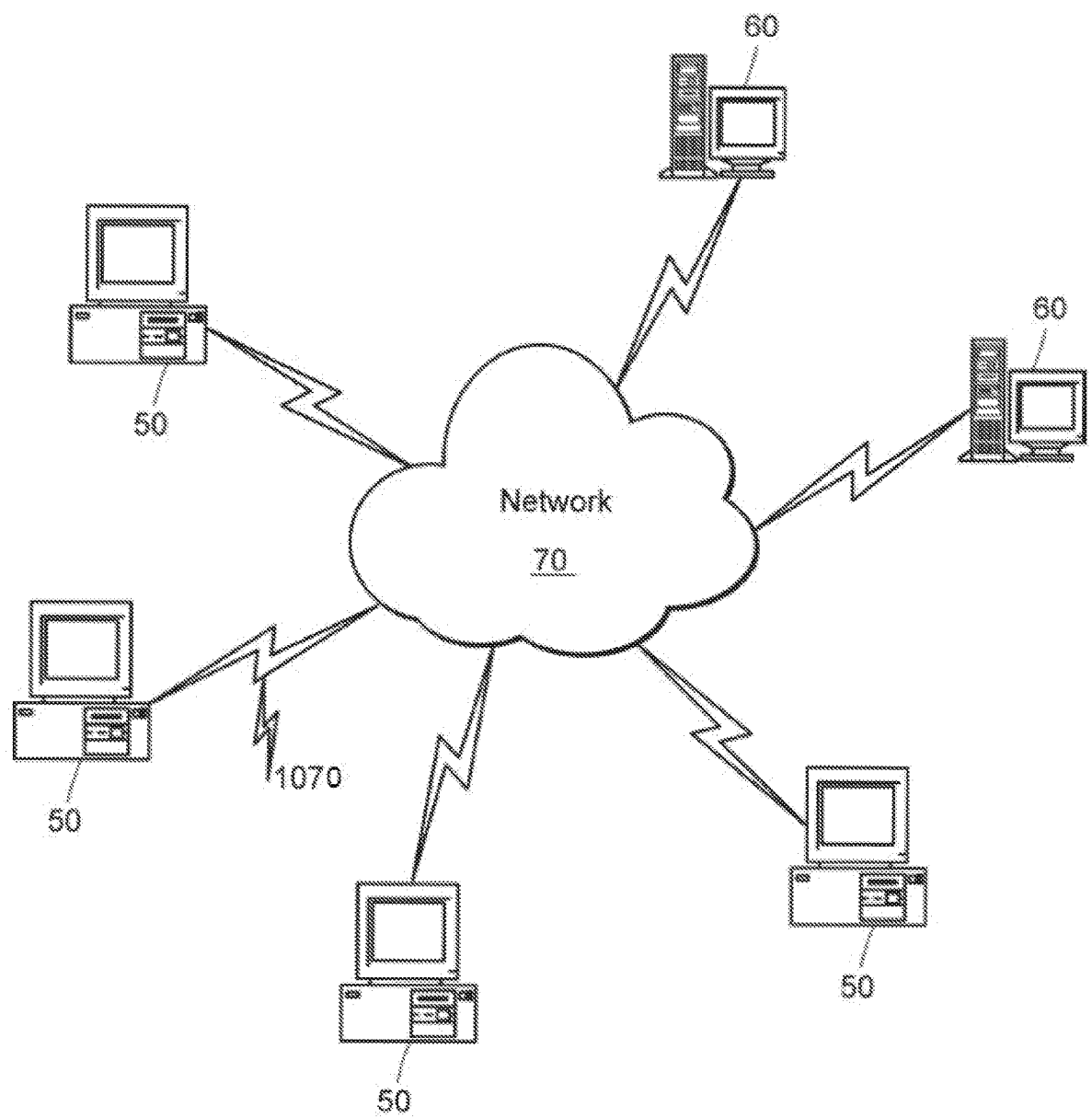
FIG. 5 is a schematic view of a computer network embodying the present invention.

FIG. 5 illustrates a computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 6:
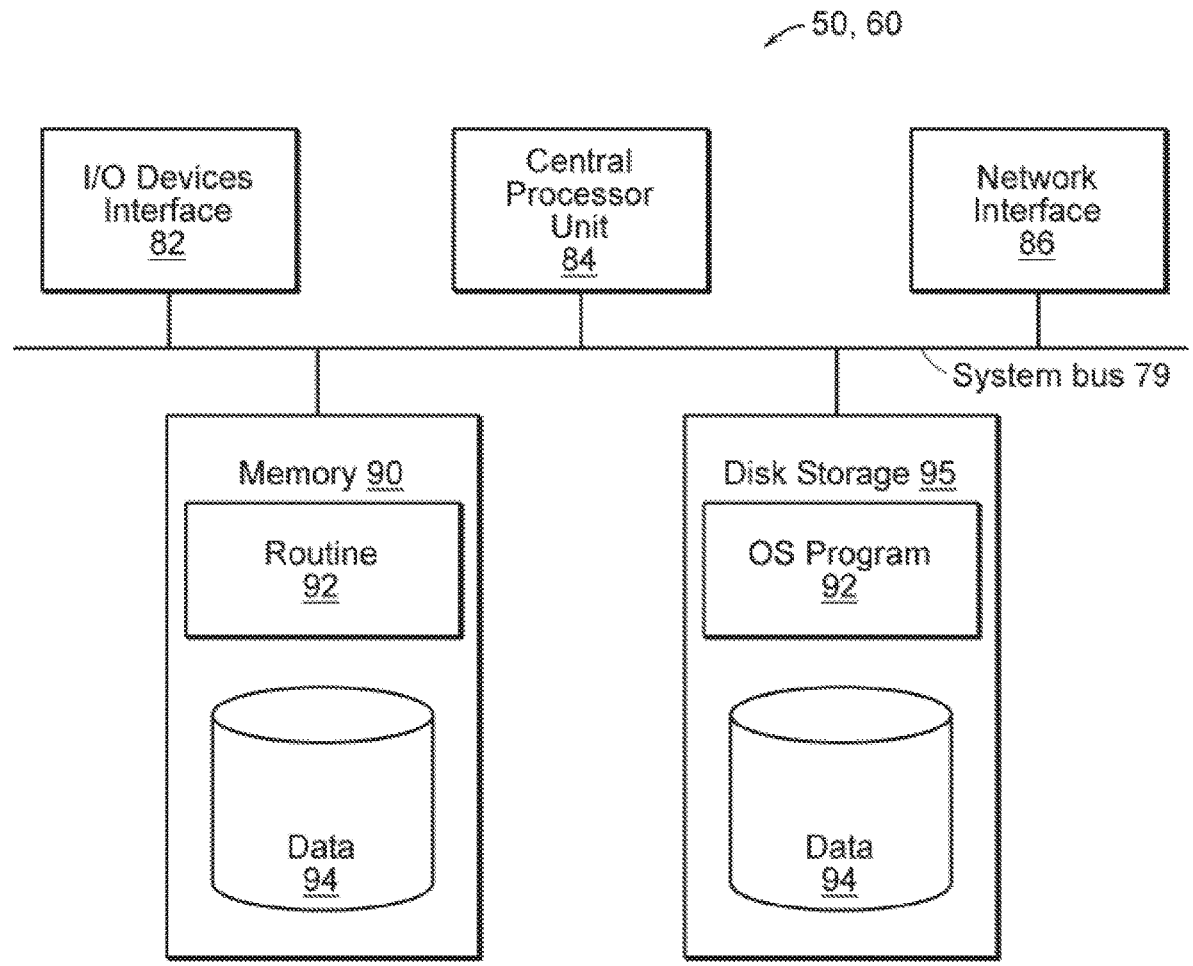
FIG. 6 is a block diagram of a computer node in the network of FIG. 4 and implementing the processes and methods of FIGS. 2 and 4A-4B.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., program code of the method 300 (FIG. 3) and FIGS. 4A-4B detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 1070 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so-called Software as a Service (SaaS), or other installation or communication supporting end-users.

As noted above, the order of the data processed during the hash operation must be the same when hashing the selected source data in the database 115 (FIG. 1) and when hashing the selected source data in the index 145 (FIG. 2). For example, after a triggering event described above (insert, delete, update), the selected source is sorted to ensure the hashing order is the same for the database 115 and the index 145. For example, the following SQL syntax allows for ordering by one or many column names in ascending (ASC) or descending order (DESC):

```
SELECT
    select_list
FROM
    table_name
ORDER BY
    [column_name | expression] [ASC | DESC]
```

It may be preferable to use the ASC sort, however a DESC sort may also be used so long as its consistently applied to both the data of the database 115 and the data of the index 145.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method by a database management system (DBMS) for validating a query result for a Structured Query Language (SQL) query of a relational database, comprising the steps of:
    receiving the SQL query requesting data of the relational database;
    identifying a corresponding set of query requested database source data stored in the database according to the query;
    resolving the relational database query by accessing a set of query requested database index source data in an index of the database corresponding to the set of query requested database source data stored in the database instead of directly accessing the set of query requested database source data in the database;
    performing a first hash operation on the query requested database source data in the database resulting in a query requested database source data first hash value;
    storing the source data first hash value in a first memory;
    performing a second hash operation on the query requested database index source data in the index of the database resulting in a query requested database source data index second hash value for the source data;
    storing the database source data index second hash value in a second memory;
    receiving a command for a data modification to content of the database after the first and/or the second hash operation was performed;
    automatically generating a trigger event indicating the data modification to content of the database after the first and/or second hash operation was performed;
    upon receipt of the trigger event, performing a third hash operation on the query requested database source data to calculate a database third hash value for the query requested database source data;
    storing the source data third hash value in the first memory replacing the source data first hash value;
    comparing the database index second hash value for the query requested database index source data with the database third hash value for the query requested database source data; and
    providing a guarantee indication for the query requested database index source data in the index of the database based upon said comparing,
    wherein the relational database comprises a plurality of records on multiple fields, the index of the database comprises a b-tree index data structure and further comprises a stored sorting of the plurality of records from the database, and the data modification to the database comprises an action selected from the group of insert, delete, and update.

2. The method of claim 1, further comprising the step of creating the index of the database.

3. The method of claim 1, wherein a first hash algorithm for the first hash operation is identical to a second hash algorithm for the second hash operation.

4. The method of claim 3, wherein a first hash algorithm the second hash algorithm comprise a cryptographic hash algorithm.

5. The method of claim 1, wherein the guarantee indication is selected from the group of the query result is guaranteed and the query result is not guaranteed.

6. A system for validating a Structured Query Language (SQL) query result for a query of a relational database, comprising:
    a database management system (DBMS) in communication with the relational database configured to perform the steps of:
        receiving the SQL query requesting data of the database;
        based on the query, identifying a corresponding set of source data stored in the database according to the query;
        resolving the query by accessing a set of query requested database index source data in an index of the database corresponding to the set of query requested database source data stored in the database instead of directly accessing the set of query requested database source data in the database;

performing a first hash operation on the query requested database source data in the database resulting in a query requested database source data first hash;

storing the source data first hash value in a first memory;

receiving a command for a data modification to content of the database;

automatically generating a trigger event indicating the data modification to content of the database; and upon receipt of the trigger event, performing a third hash operation on the query requested database source data to calculate a database third hash value for the query requested database source data;

storing the source data third hash value in the first memory replacing the source data first hash value; and an index integrity check module in communication with the DBMS and the index, the integrity check module comprising a processor and memory containing instructions that when executed by the processor perform the steps of:

performing a second hash operation on the query requested database index source data in the index of the database resulting in a query requested database source data index second hash value for the source data;

storing the database source data index second hash value in a second memory;

comparing the database index second hash value for the query requested database index source data with the database third hash value for the query requested database source data and providing a guarantee indication for the query requested database index source data in the index, wherein the relational database comprises a plurality of records on multiple fields, the index of the database comprises a b-tree index data structure and further comprises a stored sorting of the plurality of records from the database, and the data modification to the database comprises an action selected from the group of insert, delete, and update.

7. The system of claim 6, wherein a first hash algorithm for the first hash operation is identical to a second hash algorithm for the second hash operation.

8. The system of claim 7, wherein a first hash algorithm the second hash algorithm comprise a cryptographic hash algorithm.

9. The system of claim 6, wherein the guarantee indication is selected from the group of the query result is guaranteed and the query result is not guaranteed.

* * * * *